US005615280A

United States Patent [19]

Izawa et al.

[11] Patent Number: 5,615,280

[45] Date of Patent: Mar. 25, 1997

[54] APPARATUS FOR RECORDING SYMBOLS PRINTED ON DOCUMENTS OR THE LIKE

[75] Inventors: Hikaru Izawa; Yasuhiko Masuda; Toitsu Ohya; Tokimi Nago, all of Sagamihara, Japan

[73] Assignee: Japan Cash Machine Co., Ltd., Japan

[21] Appl. No.: 284,582

[22] PCT Filed: Dec. 24, 1993

[86] PCT No.: PCT/JP93/01874

§ 371 Date: Aug. 10, 1994

§ 102(e) Date: Aug. 10, 1994

[87] PCT Pub. No.: WO94/15321

PCT Pub. Date: Jul. 7, 1994

[30] Foreign Application Priority Data

Dec. 28, 1992 [JP] Japan .................................... 4-349121

[51] Int. Cl.$^6$ ...................................................... G06K 9/00

[52] U.S. Cl. ............................................ 382/135; 382/112

[58] Field of Search .................................... 382/135, 137, 382/138, 139, 140, 162, 165, 112, 321; 902/7; 194/206; 271/264, 273; 209/534, 569; 235/474, 475, 439, 470, 484, 485; 356/71; 250/556

[56] References Cited

U.S. PATENT DOCUMENTS

| | | | |
|---|---|---|---|
| 4,513,439 | 4/1985 | Gorgone et al. | 382/135 |
| 4,539,702 | 9/1985 | Oka | 382/135 |
| 4,710,963 | 12/1987 | Chapman et al. | 382/135 |
| 4,764,976 | 8/1988 | Kallin et al. | 382/135 |
| 4,881,268 | 11/1989 | Uchida et al. | 382/135 |

FOREIGN PATENT DOCUMENTS

| | | | |
|---|---|---|---|
| 338172 | 3/1983 | Japan | B65H 3/06 |
| 1233592 | 9/1989 | Japan | G07D 7/00 |
| 142210 | 12/1989 | Japan | G07D 7/00 |
| 421904 | 4/1992 | Japan | G06F 15/30 |
| 4131986 | 5/1992 | Japan | G07D 9/00 |
| 493372 | 8/1992 | Japan | G07D 9/00 |
| 4349121 | 2/1994 | WIPO | G07D 7/00 |
| WO9415321 | 7/1994 | WIPO | G07D 7/00 |

*Primary Examiner*—Leo Boudreau
*Assistant Examiner*—Bijan Tadayon
*Attorney, Agent, or Firm*—Bachman & LaPointe, P.C.

[57] ABSTRACT

Provided adjacent to the passageway for the bill 14 is an image sensor 17 which converts symbols printed on the bill 14 into electric signals during movement of the bill 14 along a passageway by a conveyer 15. Printer 19 records on printing paper the symbols based on output signals of the image sensor 17. Thus, the symbols printed on the documents may automatically be recorded.

13 Claims, 7 Drawing Sheets

APPARATUS FOR RECORDING SYMBOLS PRINTED ON DOCUMENTS OR THE LIKE

FIELD OF THE INVENTION

The present invention relates to a document handling apparatus, more particularly, to an apparatus for recording on paper patterns printed on documents or the like.

BACKGROUND OF THE INVENTION

Bill validators are used in various fields including automatic vending machines, ticket venders, automatic money deposition machines and so forth. The fundamental techniques for validation of bills or bank notes are mainly divided into optical and magnetic validation methods. In the optical validation method, photosensors are utilized to measure an amount of light reflected on a surface of a bill or permeated through a bill so that dimensions and printed conditions of the bill are represented by electric signals from the photosensors in order to decide authenticity of the bill. Also, in the magnetic validation method, magnetic sensors are employed to measure magnetic characteristics of the bill for judgment of the authenticity. There are some cases of adopting a stricter combined method of the optical and magnetic validation as occasion demand.

For example, Japanese Patent Disclosure No. 60-77287 shows a bill handling apparatus which includes a bill conveyor device and a magnetic head for bill validation; and U.S. Pat. No. 4,628,194 teaches a bill validator with optical and magnetic sensors.

under current heavy international traffic, there are many cases that require bills to be exchanged between local and foreign money. If exchanged money includes counterfeit bills, unexpected troubles would occur with owners of the money in good faith. Accordingly, at the time of finding out such fake notes, it is convenient to identify or confirm a banking facility or exchanger agency who exchanged the bills before. However, it in fact is quite difficult at present to record all symbols or numbers printed on exchanged bills and to reserve these records at the banking facilities or exchanger agencies.

Accordingly, an object of the present invention is to provide an apparatus for automatically recording on printing paper symbols printed on documents, removing the above mentioned defects in prior arts.

DISCLOSURE OF THE INVENTION

The apparatus for recording symbols of documents according to the present invention, includes conveyer means for transporting a document along a passageway; image sensor means provided adjacent to the passageway for converting symbols printed on the document into electric signals; printer means for printing operated according to output signals of the image sensor means and validator sensor; and read controller means for activating the image sensor means when the symbols printed on the document pass through the image sensor means. In an embodiment of the present invention, the document is a bill. The read controller means includes a pattern recognition device for reading the symbols printed on the document by pattern-recognition of the output signals of the image sensor means.

The conveyer means includes a rate regulator so as to reduce conveyed speed of the document when the symbols printed on the document pass through the image sensor means, and to increase the conveyed speed of the document after the symbols printed on the document pass through the image sensor means. The read controller means detects inserted condition of the conveyed document and forwards stored information in the form of inverted arrangement of the output signals to the printer means when the document is conveyed in a reverse direction.

Validator means is provided adjacent to the passageway for producing output signals to validate authenticity of the document. The read controller means has a memory device for storing the output signals from the image sensor means and for forwarding stored information to the printer means. The read controller means erases the information stored in the memory device when the validator means does not detect the authenticity of the document.

The read controller means includes symbol detector means for detecting the read condition of the symbols read by the image sensor means. The conveyer means transports the document out of the passageway through the outlet, when the validator means determines authenticity of the document and when the symbol detector means detects a full amount of the symbols to be read, but the conveyer means returns the document to the inlet by its reverse rotation when the validator means decides unauthenticity of the document. The conveyer means stops transportation of the document at the outlet when the symbol detector means can not detect a full amount of the symbols to be read, although the validator means decides authenticity of the document. The conveyer means includes a discharging device which has one-way clutch means disposed adjacent to the outlet of the passageway. A pusher means urges the document toward the image sensor means for their close contact. Edge detector means is provided ahead of the image sensor means to detect the edge of the document.

The conveyer means carries the document such as a bill along the passageway. The validator means decides authenticity of the document during movement thereof. The rate regulator of the conveyer means reduces moving velocity of the document when symbols printed on the document pass through the image sensor means, and at the same time, the read controller means activates the image sensor means. After the edge detector means detects the edge of the document, the image sensor means converts symbols printed on the document into electric signals and forwards same to the read controller means. The memory device in the read controller means stores the output signals from the image sensor means to forward them to the printer means. If the validator sensor do not detect authenticity of the document, the read controller means deletes the stored information of the memory device. After the symbols printed on the document pass through the image sensor means, the read controller means increases moving speed of the document. The pattern recognition device in the read controller means reads out the symbols printed on the document by pattern-recognizing the output signals from the image sensor means.

The printer means records the symbols printed on the document and the sort of the document based on the output signals of the image sensor means and the validator sensor. In this case, the read controller means detects inserted condition of the moved document, and forwards inverted arrangement of the output signals to the printer means if the document is conveyed in the adverse direction. When the validator means has decided authenticity of the document and also the symbol detector means has detected full amount of symbols, the conveyer means discharges the document out of the passageway through the outlet; however, when the validator means has decided unautheticity of the document, the conveyer means returns the document back to the inlet by the reverse rotation; when the validator means has judged authenticity of the document but the symbol detector means has not read full amount of symbols, the conveyer means stops movement of the document at the outlet of the passageway. Provided adjacent to the outlet rearward of the conveyer means, is the discharging device which has the one-way clutch to facilitate manual withdrawal of the document retained in the vicinity of the outlet.

PREFERRED EMBODIMENTS OF THE INVENTION

Embodiments of the present invention will be described hereinafter in connection with FIGS. 1 through 9.

Figure 1:
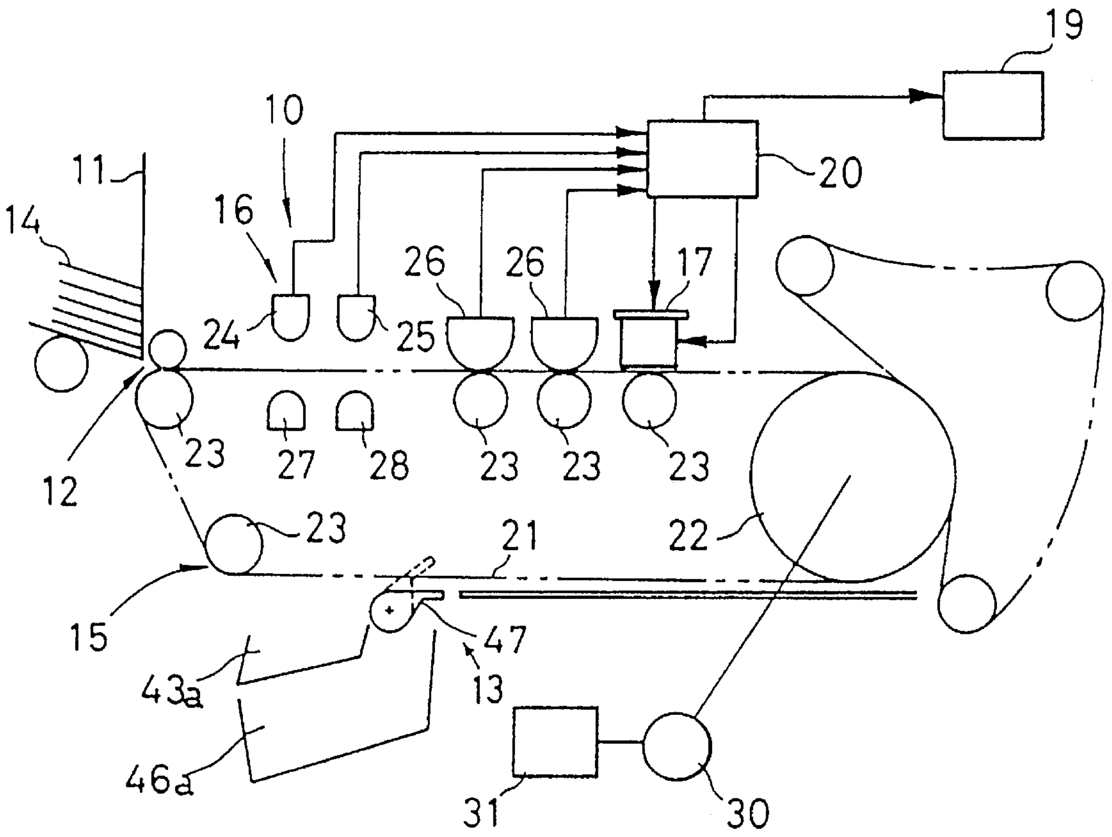
FIG. 1 is a block diagram showing a mechanical construction of the apparatus for recording symbols of documents according to the present invention.

FIG. 1 shows the embodiment of an apparatus for recording on a printing paper symbols of documents according to the present invention wherein the apparatus is denoted generally by a reference numeral 10 with validator means. The apparatus 10 is provided with conveyer means 15 for carrying a bill 14 as a document from an inlet 12 adjacent to a hopper 11 to an outlet 13. The conveyer means 15 includes belts 21, a sprocket wheel 22 to drive the belt 21 and several rollers 23 to retain the belt 21 in position. In any event, the conveyer means 15 may comprise known bill or document conveyers. Photosensors 24 and 25, magnetic sensors 26 of the validator sensor 16 and an image sensor means 17 are disposed adjacent to a passageway along which a bill 14 is carried. The validator sensor 16 functions to generate the output signals when authenticity and denomination of the bill 14 are determined based on the output signals from photosensors 24, 25 and magnetic sensor 26 which are disposed opposite to light sources 27 and 28 so that the validator sensor 16 may comprise electric and mechanical means for use in combination with conventional bill validators. For instance, outputs from photosensors 24 and 25 may be used to read out size and printed patterns of the bill 14 and then to decide whether or not the bill has its predetermined size or printed patterns. Accordingly, the light sources 27 and 28 may be visible or infrared ray diodes. The photosensors 24 and 25 receive light which either permeates through or reflects on the bill 14 after emission from the light sources 27 and 28. Then, the magnetic sensors 26 detect magnetic material printed on the bill 14.

Figure 5:
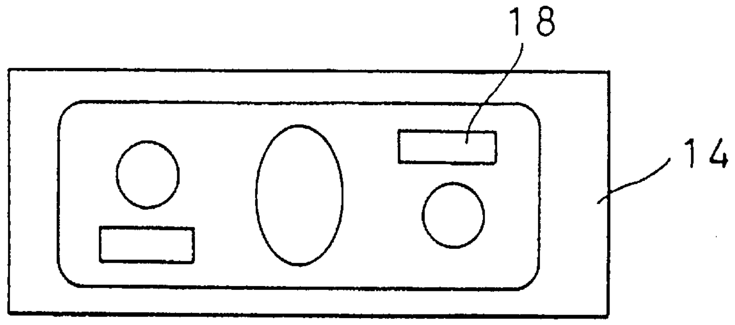
FIG. 5 is a front view of a bill.

The image sensor means 17 converts into electric signals symbols 18 printed on the bill 14 such as bill numbers or symbols (FIG. 5) indicated by figures, numerals, alphabets or other marks. The symbols 18 representative of numbers are previously printed on the bill 14 in position as shown in FIG. 5. Consequently, validator means in the read controller means 20 can automatically decide positions of symbols 18 by exactly reading denomination of the bill 14 from output signals of the validator sensor 16. After the validator means in the read controller means 20 reads out authenticity and denomination of the bill 14, the image sensor means 17 is activated when symbols 18 printed on the bill 14 pass through the image sensor means 17. Not shown but, provided in the read controller means, is pattern recognition device to read out the symbols 18 printed on the bill 14 by pattern-recognition from the output signals of the image sensor means 17. In some cases, bills 14 are positioned in an adverse direction within a hopper 11 and then carried by the conveyer means 15 in the inverse condition. In this case, the read controller means 20 detects the supplied direction of the carried bill 14 by receiving output signals of the validator sensor 16, and inverts the arrangement of the output signals to be forwarded to the printer means 19 when the bill 14 is transported in the adverse direction. The read controller means 20 has a memory device 32 to store the output signals of the image sensor means 17 and then forward same to the printer means 19, but the read controller means 20 deletes the information stored in the memory device 32, when the validator means in the read controller means 20 does not decide authenticity of the bill 14 after the read controller means 20 has received the output signals of the validator sensor 16. The printer means 19 records on printing paper 49 the symbols 18 printed on the bill 14 and the denomination of the bill 14 based on the output signals of the read controller means 20 which receives output signals from the image sensor means 17 and the validator sensor 16.

The conveyer means 15 includes a motor 30 and a motor driving circuit 31 to drive the sprocket wheel 22. The motor driving circuit 31 has a rate regulator to control the moving velocity of the bill 14 so that it reduces the moving speed of the bill 14 when the symbols 18 printed on the bill 14 pass through the image sensor means 17, but increases the velocity of the bill 14 after the symbols 18 printed on the bill 14 have passed through the image sensor means 17. The read controller means 20 easily decides the transit timing of the symbols 18 on the bill 14 through the image sensor means 17 based on the moving velocity of the belts 21 when the bill 14 carried by the belt 21 passes through the photosensor 24.

Figure 2:
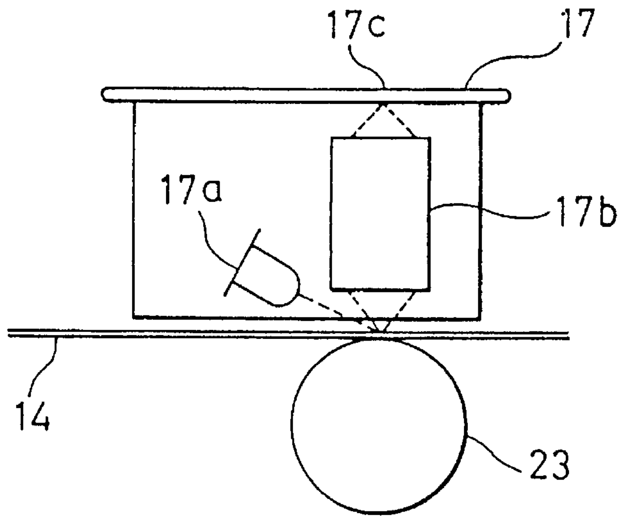
FIG. 2 is a sectional view of the image sensor means.

As understood from FIG. 2, the image sensor means 17 includes a light source 17*a*, a light collective fiber 17*b* for receiving the light which is emitted by the light source 17*a* and reflected on the bill 14, and CCD image sensor means 17*c* for receiving the light emitted from the light collective fiber 17*b*. The CCD image sensor means 17 generates output signals to the read controller means 20.

Figure 3:
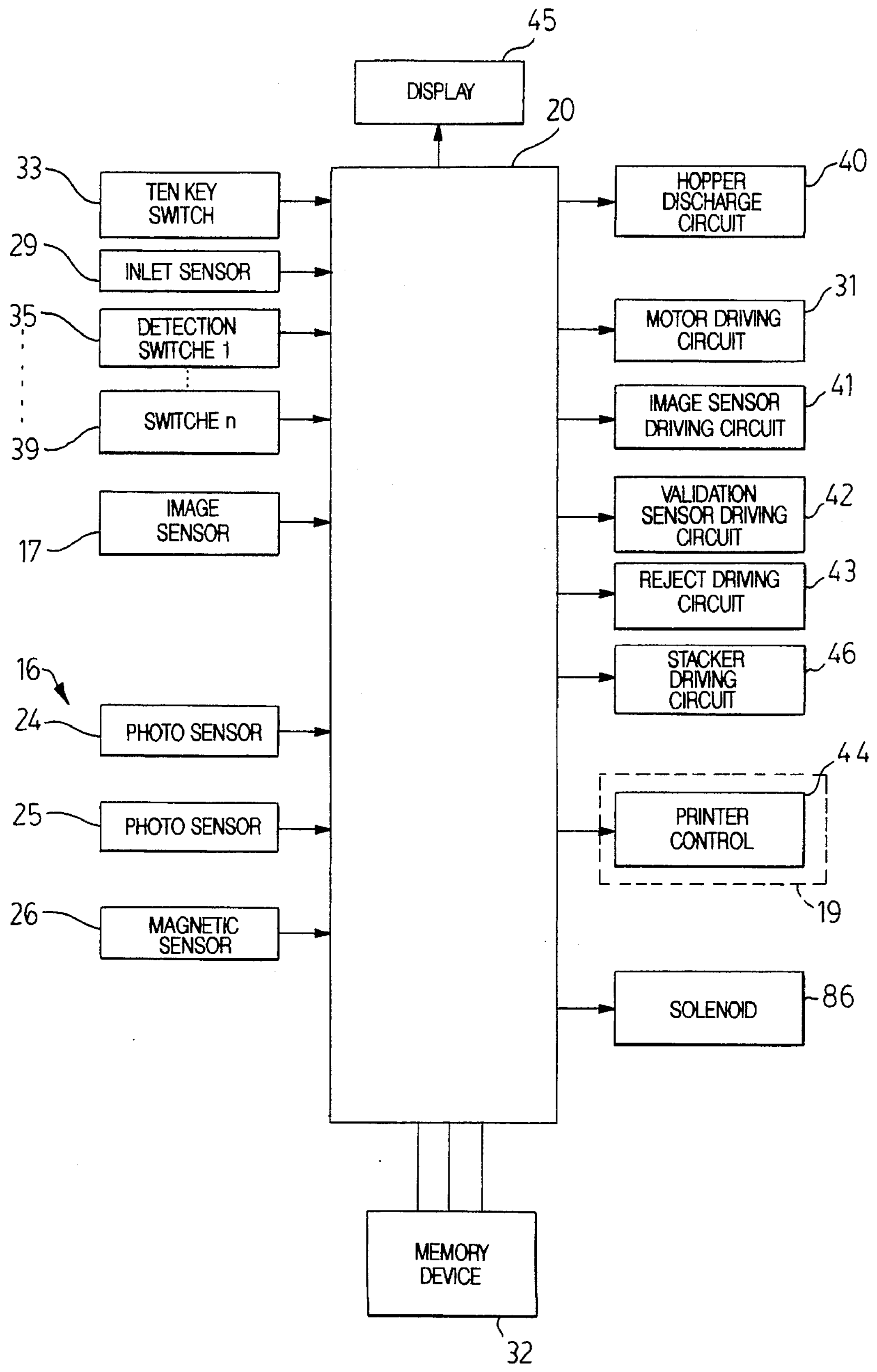
FIG. 3 is a circuit diagram which shows the electric construction of the apparatus for recording symbols of documents according to the present invention.

The read controller means 20 of FIG. 3 may preferably be formed by one-chip microcomputer in practice. The read controller means 20 comprises ten-key switches 33 to input programmed commands into the read controller means 20, an inlet sensor 29 having photo couplers to activate the read controller means 20, a plurality of detection switches 35 to 39 arranged adjacent to the hopper 11 and the conveyer means 15 for detecting existence of the bill 14 in the hopper 11 and various conditions of the bill 14, the image sensor means 17, and input terminals to receive the output signals from the validator sensor 16.

The read controller means 20 further comprises a hopper discharge circuit 40 for controlling discharge of the bill 14 from the hopper 11, a motor driving circuit 31, an image sensor driving circuit 41 for controlling activation and deactivation of the image sensor means 17, a validator sensor driving circuit 42 for controlling activation and deactivation of the validator sensor 16, a reject driving circuit 43 for keeping an invalid bill 14 in a given space, a stacker driving circuit 46 for stacking valid bills 14 in position, and output terminals connected with a printer control circuit 44 in the printer means 19. A display 45 is provided in the read controller means 20 to indicate the truth of the bill 14 and other conditions. The reject driving circuit 43 and the stacker driving circuit 46 respectively have a reject pocket 43*a* and a stacker 46*a* for receiving the bill 14 supplied by the conveyer means 15. Provided beneath the conveyer means 15 is a deflector 47 whose angle decides a selected stacked place of the bill 14 in the reject pocket 43*a* or the stacker 46*a*.

Figure 4:
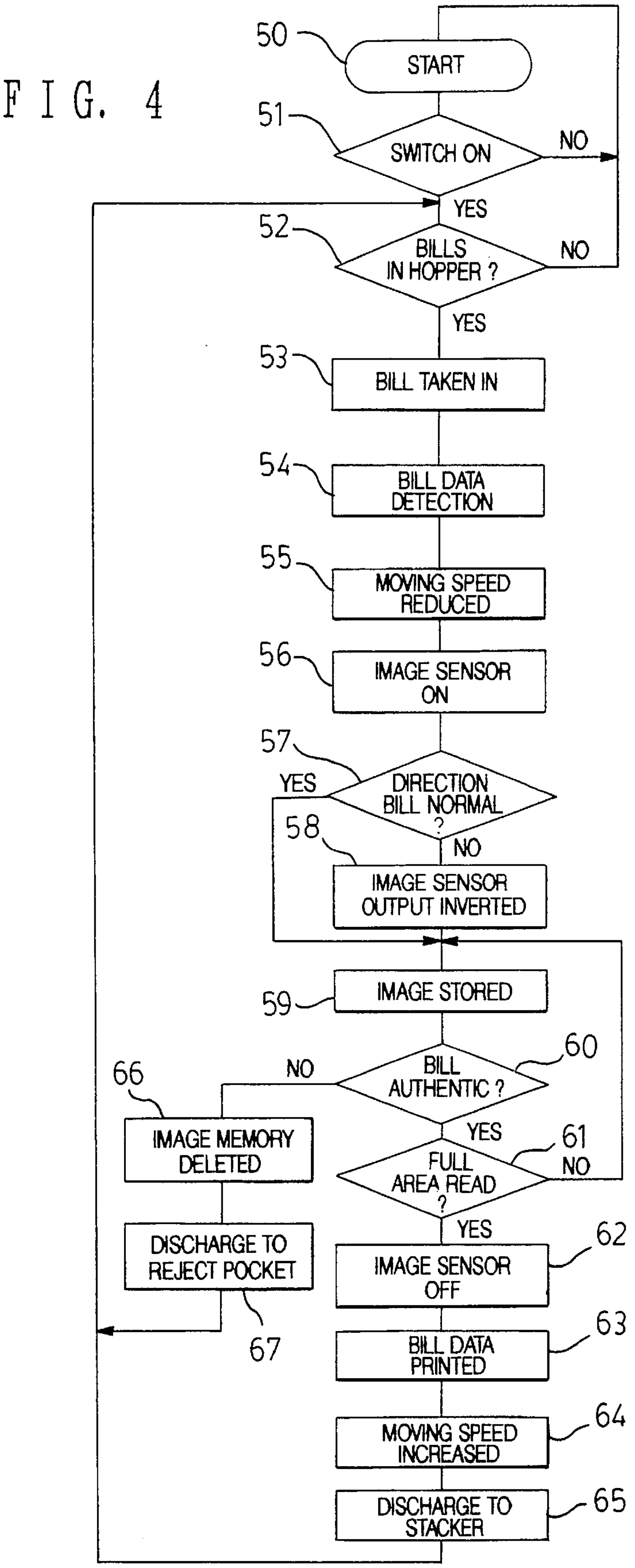
FIG. 4 is a flow chart showing the operative sequence of the read controller means shown in FIG. 3.

In the embodied construction of the invention as above, an operative sequence of the apparatus 10 will be described in connection with a flow chart shown in FIG. 4.

In Steps 50 "START" and 51, the read controller means 20 decides whether or not the inlet sensor 29 is turned on. If the inlet sensor 29 is in the "OFF" condition, the step returns to "START", however, if it is turned on, the processing goes from Step 51 to 52. When the detection switch 35 detects existence of the bill 14 in the hopper 11 in Step 52, the read controller means 20 generates the output signals to the hopper discharge circuit 40 to feed the bill 14 to the conveyer means 15 out of the hopper 11. Simultaneously, the read controller means 20 supplies the output signals to the motor driving circuit 31 to drive the conveyer means 15 (Step 53). Thus, the conveyer means 15 carries the bill 14 along the passageway from the inlet 12 to the outlet 13. When the front edge of the bill 14 passes through the photosensor 24, the read controller means 20 starts counting the traveling amount of the bill 14. Also, the photosensors 24, 25 and the magnetic sensors 26 detect the dimensions and optical—magnetic characteristics of the bill 14 during passage through these sensors 24, 25 and sensors 26 which then forwards their outputs to the read controller means 20 (Step 54) wherein the validator means decides the denomination and the authenticity of the moving bill 14.

The read controller means 20 measures the transported amount of the bill 14, and decides the passage timing of the symbols 18 printed on the bill 14 through the image sensor means 17 so that the read controller 20 reduces the moving velocity of the bill 14 by the rate regulator of the motor driving circuit 31 when the symbols 18 reach immediately before the image sensor means 17 (Step 55). In case the motor 30 is a stepping motor, the moving velocity of the bill 14 may be reduced by forwarding pulses at the decreased rate to the rate regulator of the motor driving circuit 31. Otherwise, adjusted analog power can be fed to the rate regulator of the motor driving circuit 31 to reduce the moving velocity of the bill 14.

When the symbols 18 printed on the bill 14 pass through the image sensor means 17, the read controller means 20 also generate output signals to the image sensor driving circuit 41 to activate the image sensor means 17 (Step 56). The image sensor means 17 converts the symbols 18 printed on the bill 14 into electric signals. At this time, the read controller means 20 confirms the inserted direction of the moving bill 14 based on information forwarded from the validator sensor 16 in Step 57, and the read controller means 20 inverts the alignment of the output signals from the image sensor means 17 if the inserted direction of the bill is reverse to the predetermined moving direction of the bill in Step 58, and then the memory device 32 stores information of the denomination and images of the symbols of the bill 14 in the predetermined condition in Step 59. When the bill 14 is inserted and carried in the predetermined direction in Step 57, the processing jumps from Step 57 to 59.

Figure 6:
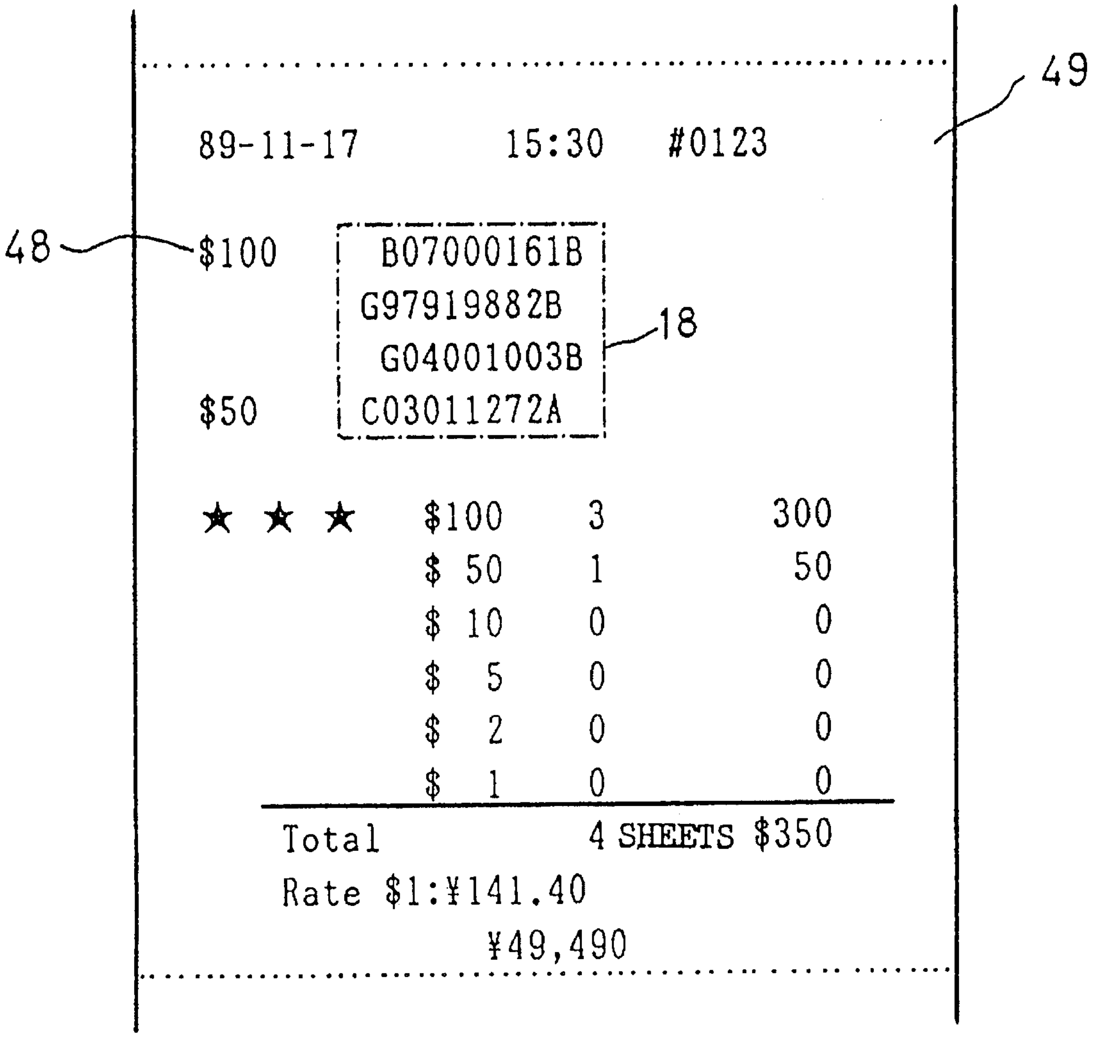
FIG. 6 is a front view of a recording paper with recorded symbols and denominations.

Now, in Step 60, the read controller means 20 judges authenticity or unauthenticity of the bill 14. When the bill 14 is authentic, it judges whether or not it has completed reading of the whole area of the symbols 18 in Step 61. Before completion of reading the whole area of the symbols 18, the processing goes back to Step 59. After completion of reading the whole area of the symbols 18 in Step 62, the read controller means 20 stops supply of the output signals to the image sensor driving circuit 41 to deactivate the image sensor means 17. Subsequently, in Step 63, the output signals of the image sensor means 17 stored in the memory device 32 of the read controller means 20 are then forwarded to the printer means 19. According to the output signals from the read controller means 20, the printer means 19 records on the recording paper 49 an image of the symbols 18 printed on the bill 14 and the denomination of the bill 14. FIG. 6 shows an example of the recording paper 49 bearing the printed image of symbols 18 and a denomination 48. Also, indicated on the recording paper 49 are information about date, time, total amounts of money according to denominations, whole total amount of money, exchange rate, number of dispensed bills and so forth. Timer and operational circuitry means installed in the read controller means 20 automatically indicates on the display 45 these information about date, time, total amounts of money according to denominations, whole total amount of money, exchange rate, number of dispensed bills and so forth. The money exchange rate is input with the ten-key switches 33.

After the symbols 18 on the bill 14 pass through the image sensor means 17, the read controller means 20 forwards increased pulse rates to the motor driving circuit 31 to hasten the moving speed of the bill 14 (Step 64). Then, the bill 14 is discharged out of the outlet 13 through the deflector 47 downward in the stacker 46*a* by operation of the stacker driving circuit 46 (Step 65).

Upon deciding unauthenticity of the bill 14 in Step 60, the read controller means 20 deletes information stored in the memory device 32 in Step 66, and then causes the bill 14 to move toward the reject pocket 43*a* by operating the deflector 47 and the reject driving circuit 43 of the conveyer means 15. Consequently, the printer means 19 is not operated when the bill 14 is not authentic.

Figure 7:
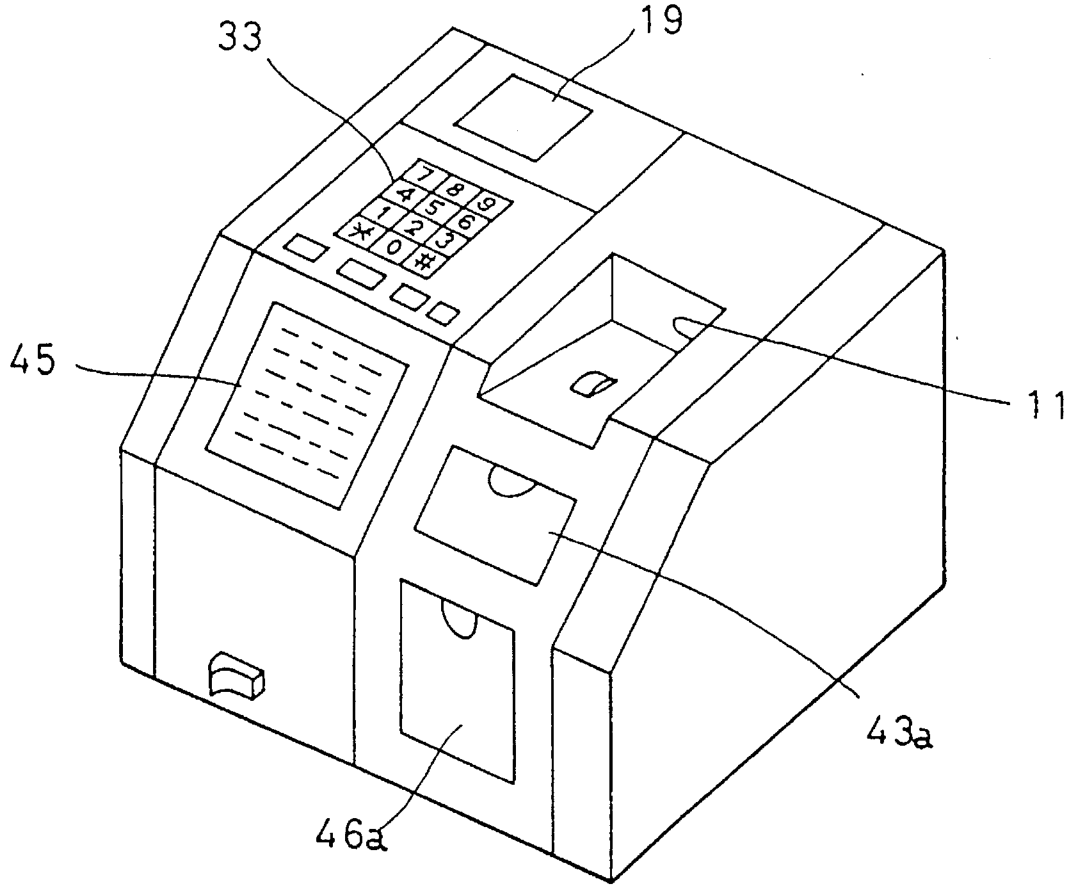
FIG. 7 is a perspective view of the apparatus for recording symbols of bills indicating an embodiment according to the present invention.

FIG. 7 shows a perspective view of the apparatus 10 for recording symbols of bills according to the embodiment of the present invention. Provided on the top of the apparatus 10 for recording symbols of bills are the ten-key switches 33, the printer means 19 and the hopper 11. Disposed below the hopper 11 are a reject pocket 43*a* for receiving unauthentic bill 14 and a stacker 46*a* for accumulating authentic bills 14. Also, the display 45 is disposed on the inclined side of the apparatus 10.

In the embodiment mentioned above, when no pattern of the symbols can be identified by pattern recognition, the bill, although authentic, is discharged into either the reject pocket 43*a* or the stacker 46*a*. However, in this case, there is a defect in that authentic and unauthentic bills may be accumulated together in the reject pocket 43*a*, and bills of clear and unclear symbols may be accumulated together in the stacker 46*a*, thereby resulting in troublesome handling of the bills. In addition, provision of the reject pocket 43*a* causes the apparatus to become large in size and expensive in manufacture.

Figure 8:
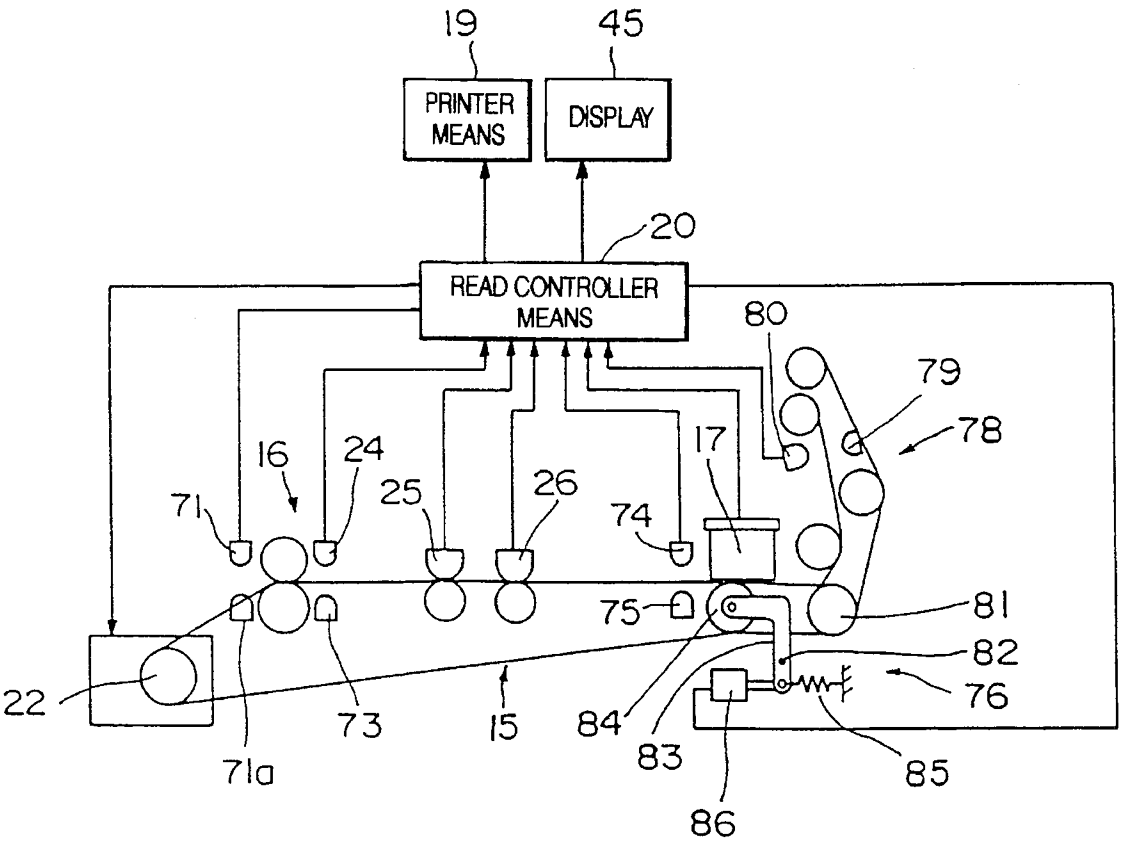
FIG. 8 is a schematic diagram of the apparatus for recording symbols of bills indicating another embodiment of the present invention.

As shown in FIG. 8 indicating another embodiment according to the present invention, the apparatus 10 for recording symbols of bills, comprises an inlet sensor 71 of such as a photo transistor disposed opposite to a light emitting diode (LED) 71*a*, an LED 72 disposed opposite to the inlet sensor 71, an LED 73 disposed opposite to the photosensor 24, an edge detector means 74 for detecting an edge of the bill 14 ahead of the image sensor means 17, an LED 75 arranged opposite to the edge detector means 74, pusher means 76 disposed opposite to the image sensor means 17 for urging the bill 14 against the image sensor means 17, a discharging device 78 disposed as a part of the conveyer means 15 adjacent to the outlet 13, edge detector means 79 provided adjacent to the outlet 13 of the discharging device 78 for detecting the edge of the bill 14, and an LED 80 arranged opposite to the edge detector means 79. A sprocket wheel 81 drives the belt wound around the discharging device 78. The sprocket wheel 81 has one-way clutch not shown.

The pusher means 76 comprises a bell crank 84 pivotally mounted on a shaft 82, a roller 84 rotatably mounted at one end of the bell crank 83 for urging the bill 14 against the image sensor means 17, a spring 85 connected with the other end of the bell crank 83 for resiliently urging the roller 84 away from the image sensor means 17, and a solenoid 86 for activating the roller 84 toward the image sensor means 17 against the resilient force of spring 85.

Figure 9:
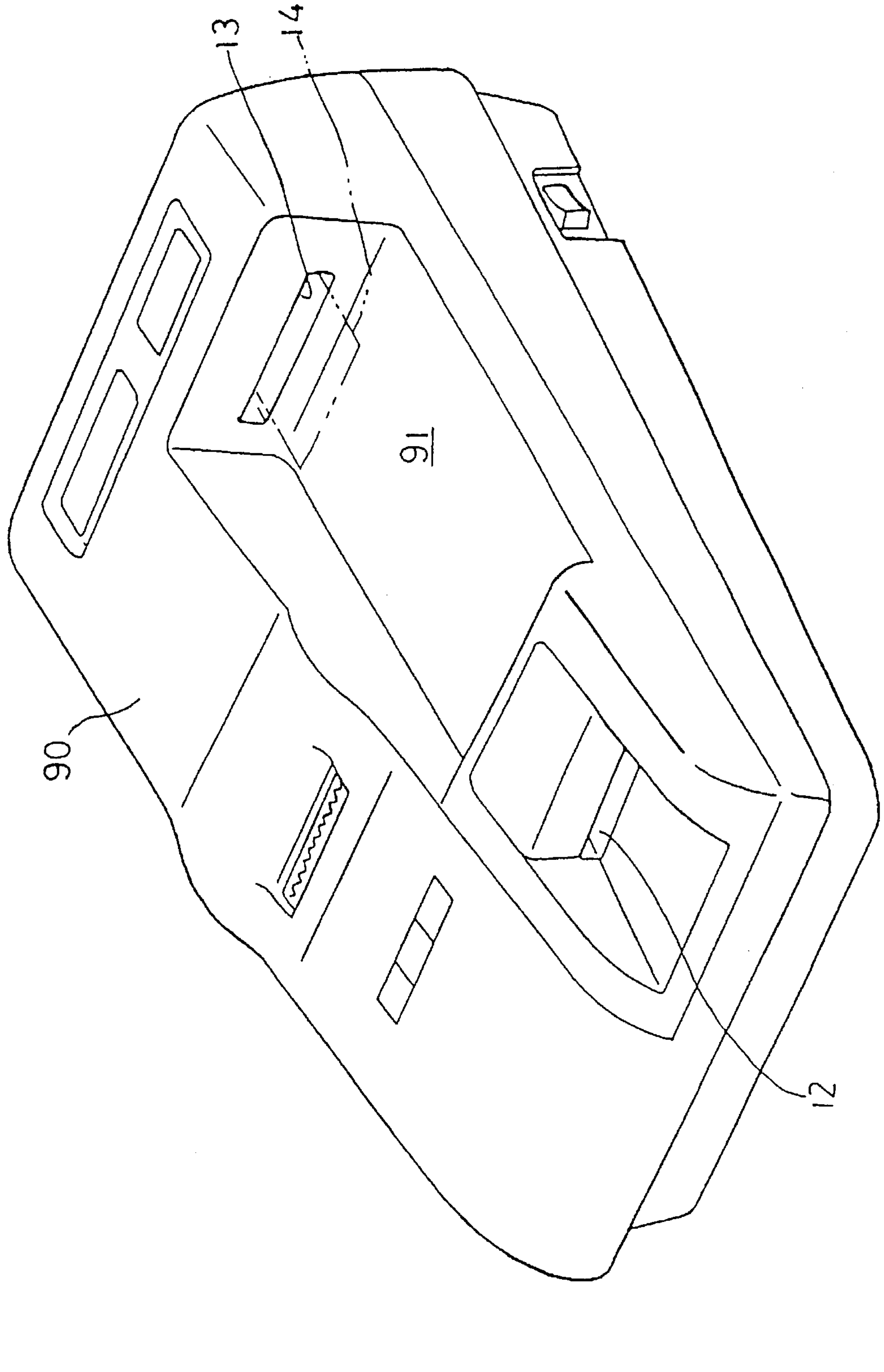
FIG. 9 is a perspective view of the apparatus for recording symbols of bills shown in FIG. 8.

As is apparent from FIG. 9, the apparatus according to the invention may include a case 90, an inlet 12 and an outlet 13 formed in the case 90 and a table 91 to hold the bill 14 discharged from the outlet 13.

In the above-mentioned construction, when a bill 14 is inserted into the inlet 12, the inlet sensor means 71 detects insertion of the bill 14. The read controller means 20 rotates the motor of the conveyer means 15 in forward direction due to the output signals of the inlet sensor 71. Thus, the bill 14 is carried through the validator sensor 16 and the edge detector means 74. Subsequently, the read controller means 20 decides authenticity or unauthenticity of the bill 14 in view of the output signals of the validator sensor 16.

When the bill 14 is authentic, the solenoid 86 operates against the resilient force of the spring 85 to urge the bill 14 toward the image sensor means 17 by the roller 84. Receiving the output signals of the edge detector means 74, the read controller means 20 decides the position of the symbols printed on the bill 14 by use of the drive pulses supplied to the motor (a stepping motor) of the conveyer means 15, and when the printed symbols 18 pass through the image sensor means 17, it is activated. Symbol detector means in the read controller means 20 judges whether or not full read signals of the symbols are detected from output signals of the image sensor means 17. When the symbol detector means detects full read signals of the symbols, the printer means 19 records the image on the recording paper 49 from the signals of symbols. Also, these results are indicated on the display 45 after the bill 14 passes through the edge detector means 79, after the conveyer means 15 is driven by a given stroke, or after the motor of the conveyer means stops. In this case, the bill 14 is entirely discharged from the outlet 13 in the overturned condition on the table 91.

When the symbol detector means does not detect the full signals of the symbols, the bill 14, already carried from the conveyer means 15 toward the discharging device 78, is further moved to a certain extent of moving length so that the discharging device 78 stops movement of the bill 14 in its condition partly projecting from the outlet 13 as shown by a dotted line in FIG. 9. In the stopped condition of the discharging device 78, the display 45 indicates the failure of reading the symbols, while the edge detector means 79 successively detects existence of the bill 14. The one-way clutch provided in the sprocket wheel facilitates to manually pull out the bill 14 projecting from the outlet 13.

When the bill 14 is unauthentic, the display 45 indicates the unauthenticity, while the driving motor of the conveyer means 15 is stopped once and then rotated in the reverse direction. The bill 14, therefore, is discharged from the inlet 12 after reversely passing through the validator sensor 16 and the inlet sensor 71 to stop the conveyer means 15.

Worked modes of the present invention may be varied in various ways without limitation to the foregoing embodiments. For instance, in addition to simple duplication of a part of the symbols 18, a pattern recognition device may be installed in the read controller means 20 so that symbols 18 printed on the bill 14 can be read by pattern-recognizing the output signals of the image sensor means 17. By virtue of pattern-recognition of the symbols 18 stored in the memory device 32, computerized retrieval search of many stored symbols 18 may easily be made. The memory device 32 preferably may include hard discs or other various storage media equipped in the read controller means 20 as well as RONs or RAMs connected therewith. It also may be designed to discharge on the reject pocket 43*a* a bill which has the symbols unrecognizable by a pattern-recognition device and therefore considered unauthentic. Moreover, it would be self-explanatory to those skilled to apply the present invention also to recording of symbols printed on other documents other than bills such as, for example, valuable papers, while the foregoing embodiment exhibits the apparatus for recording symbols of "bills".

AVAILABILITY IN INDUSTRY

As described above, obviously the present invention provides the apparatus for recording symbols of documents capable of automatically reading the surface printed on documents and recording same on printing paper for labor saving operation in handling documents.

We claim:

1. An apparatus for recording symbols printed on a document, which comprises: conveyer means for transporting a document inserted from an inlet along a passageway to an outlet; validator means having a validator sensor disposed along the passageway for validating the authenticity of the document; printer means for printing information by outputs of said validator means, said validator sensor producing output signals to decide authenticity of document; image sensor means disposed adjacent to said passageway for converting into electric signals symbols printed on the document; read controller means for activating said image sensor means when the symbols printed on the document pass through said image sensor means; and a detector means for detecting the read condition of the symbols read by the image sensor means; and said conveyor means transporting the document out of the passageway through the outlet when said validator means determines the authenticity of the document and when said detector means detects a full amount of the symbols to be read.

2. The apparatus of claim 1, wherein said document is a bill.

3. The apparatus of claim 1, wherein said read controller means includes a pattern recognition device for reading the symbols printed on the document by pattern-recognition from the output signals of said image sensor means.

4. The apparatus of claim 1, wherein said conveyer means includes a rate regulator for controlling and reducing moving velocity of said document when the symbols printed on the document pass through said image sensor means.

5. The apparatus of claim 4, wherein said conveyer means increases the moving velocity of the document after the symbols printed on the document pass through said image sensor means.

6. The apparatus of claim 1, wherein said read controller means detects inserted condition of the conveyed document and forwards varied arrangement of the output signals to said printer means when the document is conveyed in the reverse direction.

7. The apparatus of claim 1 wherein said conveyer means includes a discharging device which has one-way clutch means disposed adjacent to the outlet of said passageway.

8. An apparatus of claim 1, further including pusher means for urging the document toward said image sensor means for close contact with said image sensor means.

9. The apparatus according to claim 1, wherein said printer means being operated to print on printing paper the image according to the symbols based on the output signals of said image sensor means.

10. An apparatus according to claim 9, wherein said image sensor means disposed adjacent to said passageway is for converting into electric signals pixels of image points of symbols printed on the document, and wherein said printer means is operated to print on printing paper the image according to the pixels of said image points.

11. An apparatus for recording symbols printed on a document which comprises: conveyer means for transporting a document inserted from an inlet along a passageway to an outlet; validator means having a validator sensor disposed along the passageway for validating the authenticity of the document; printer means for printing information by outputs of said validator means, said validator sensor producing output signals to decide authenticity of document; image sensor means disposed adjacent to said passageway for converting into electric signals symbols printed on the document; read controller means for activating said image sensor means when the symbols printed on the document pass through said image sensor means; symbol detector means for detecting the read condition of the symbols read by the image sensor means; said printer means being operated to print on printing paper the image according to the symbols based on the output signals of said image sensor means; and said conveyer means transporting the document out of the passageway through the outlet when said validator means determines the authenticity of the document and when said symbol detector means detects a full amount of the symbols to be read.

12. An apparatus according to claim 11, wherein said conveyer means returns the document to the inlet by reverse rotation when said validator means decides unauthenticity of the document; and said conveyer means stopping transportation of the document at the outlet when said symbol detector means cannot detect a full amount of the symbols to be read, although said validator means detects authenticity of the document.

13. The apparatus of claim 11, further comprising edge detector means provided ahead of said image sensor means for detecting the edge of the document.

* * * * *